Figure 1:
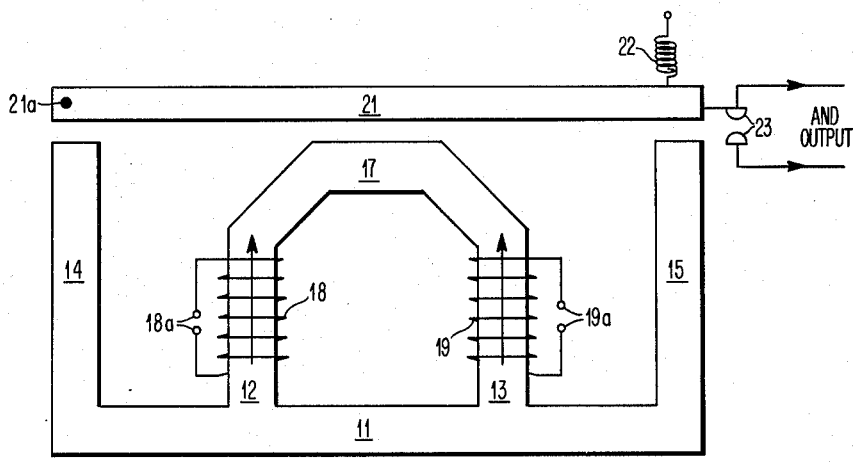

April 7, 1964   E. A. BROWN ETAL   3,128,417
ELECTROMAGNETIC LOGIC APPARATUS
Filed Dec. 20, 1960

*INVENTORS*
EDGAR A. BROWN
GUNTER H. SCHACHT
BY

*ATTORNEY*

United States Patent Office 3,128,417
Patented Apr. 7, 1964

3,128,417
ELECTROMAGNETIC LOGIC APPARATUS
Edgar A. Brown, Gilroy, and Gunter H. Schacht, San Jose, Calif., assignors to International Business Machines Corporation, New York, N.Y., a corporation of New York
Filed Dec. 20, 1960, Ser. No. 77,050
9 Claims. (Cl. 317—155.5)

This invention relates to electromagnetic apparatus and relates more particularly to electromagnetic apparatus for performing logical operations.

Logical operations have heretofore generally been performed by electronic devices which serve as AND gates, OR gates or other similar logical devices in data processing equipment and other applications. The present invention is directed to electromagnetic apparatus which is capable of performing the function of a multiple input AND gate. The present invention provides a magnetic core structure including a base member and a plurality of legs which are in parallel with each other between the base member and a movable armature. In one condition of the apparatus the armature is separated from the legs by an air gap, and in another condition an armature is magnetically retained against the legs. Each of the legs is provided with a coil which is energizable by one of the plurality of pulses or signals whose coexistence in time is to produce an AND output. Each coil produces a magnetomotive force in its associated leg, and each of the coils is so wound and energized that its magnetomotive force opposes the magnetomotive forces in the other legs. When at least one but less than all of the coils are energized, the flux from the energized coil or coils will flow through the leg or legs whose coil or coils are de-energized. Under these circumstances, the armature will have one predetermined position, and regardless of the magnitude of energization of the energized coils, no change will occur in the position of the armature. However, when all of the coils are energized, indicating the coexistence of the input pulses, the magnetomotive forces in the different legs all oppose each other so that there is no appreciable flow of flux from any one leg to any of the other legs. Under these conditions the change in flux causes the armature to change its position and it is this change of position which indicates the simultaneous energization of all the coils of the device to produce an AND indication.

In one embodiment of the present invention, the core structure includes a first pair of magnetic legs which are disposed in parallel between the base member and an air gap which separates the magnetically joined ends of the legs from an armature. The structure also includes a second pair of core members which are disposed in parallel between the base member and the armature and which are not provided with windings. Both of the first pair of legs are provided with selectively energizable windings, and the magnetomotive forces of these windings oppose each other in their respective legs. With only one of the coils energized, the flux therefrom circulates only through the path including the magnetic member joining the legs, the other leg and the base member, and does not flow through the air gap to the armature. Regardless of the magnitude of the M.M.F. of the energized coil, the flux resulting therefrom still does not bridge the air gap and flow through the armature, since the reluctance of the magnetic path including the opposite leg and the base member is so much lower than the reluctance of the path including the air gap to the armature. Thus, the armature remains in a predetermined position, which in this case is the unattracted position.

However, when both coils are energized, the M.M.F.'s of the two coils oppose each other and hence force the flux from the two coils to flow through the air gap to the armature and then across other air gaps back through the second pair of core members and the base member. This flux flow will attract the armature to the leg members and hence provide an indication which serves as a measure of the coexistence of energization of the two coils.

In an alternative embodiment of the present invention, the core structure is in the form of three spaced legs having a common magnetic base member. The other ends of each of the legs are disposed across air gaps from an armature member which is generally parallel to the end of these legs. When at least one but less than all of the coils is energized, the armature will be attracted. The flux from the energized coil or coils will flow through all three legs, including the leg or legs whose coil is de-energized and through the common magnetic base member. Under these circumstances, the armature is in a predetermined attracted position. However, when all three coils are energized, the magnetomotive forces therefrom oppose each other so that no appreciable flux will flow from the pole faces formed by the ends of the legs through the air gaps to the armature. With no appreciable flux flowing through the armature, the armature will be no longer magnetically retained against the pole faces and will be moved to a second position indicating the coexistence of energization in all three coils.

It is therefore an object of the present invention to provide improved electromagnetic apparatus for performing logical operations.

It is a further object of the present invention to provide electromagnetic apparatus for performing logical functions in response to current pulses which is substantially independent of the magnitude above a certain minimum level, of the current pulses utilized.

It is an additional object of the present invention to provide electromagnetic apparatus for performing logical functions in response to receipt of a plurality of input pulses in which the apparatus is capable of detecting coexistence in time of these pulses without requiring coincidence in time.

Figure 2:
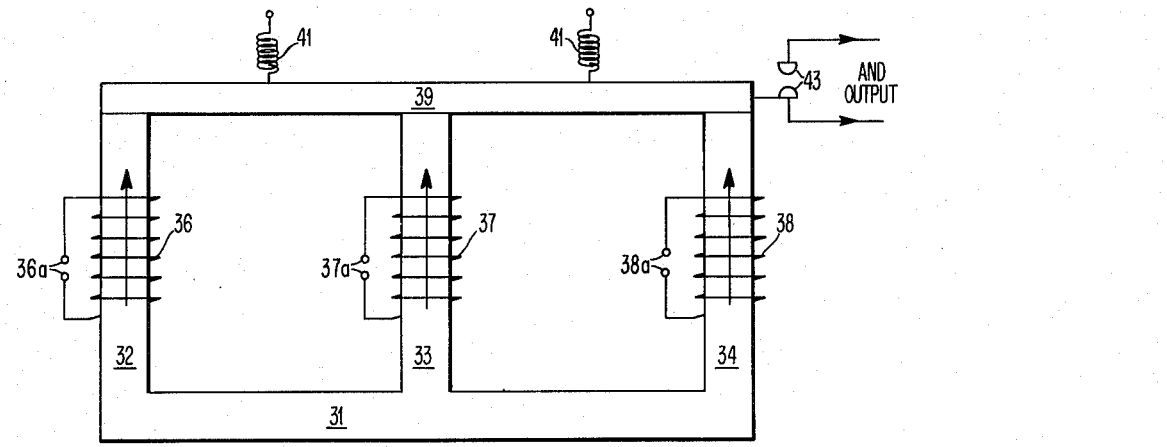

Objects and advantages other than those set forth above will be apparent from the following description when read in connection with the accompanying drawings, in which FIG. 1 diagrammatically illustrates one embodiment of the present invention utilizing a pair of electromagnetic coils to function as a two input AND gate, and FIG. 2 diagrammatically illustrates apparatus in accordance with the present invention utilizing three electromagnetic coils to function as an AND gate.

Referring to FIG. 1 by character of reference, numeral 11 designates a magnetic base member to which are magnetically joined a first pair of core legs 12 and 13 and a second pair of core members 14 and 15. The ends of legs 12, 13 opposite to those ends which join base member 11 are magnetically bridged by a magnetic bridging member 17. Member 17 is preferably of the same magnetic material and cross section as legs 12 and 13 to provide a low reluctance flux path between these legs. Leg 12 is provided with an energizing winding 18 thereon. Winding 18 has input terminals 18a to which is supplied one of the input pulses which is to be utilized in generating the AND output. Core leg 13 is provided with a similar winding 19 having input terminals 19a to which the other input signal is supplied. It will be understood that in the AND function it is desired to produce an output signal when and only when input signals are present at both pairs of terminals 18a, 19a. The magnetomotive force (M.M.F.) of coil 18 opposes the M.M.F. of coil 19, and vice versa, as shown by the arrows associated with the respective core legs.

The structure of FIG. 1 also includes an armature member 21 which is pivoted at a suitable point 21a. Armature 21 has a first position in which it is separated from the magnetic core structure and has a second position in which it abuts the ends of the core legs. Armature 21 is biased in one direction by suitable means such as a spring 22 which provides a suitable air gap between the armature and the pole faces formed by the ends of the core legs. Movement of armature 21 represents the indication of the AND function, and this movement may be converted into an appropriate signal by any suitable means, such as through a pair of contacts 23 which are open when armature 21 is in the withdrawn position shown in the drawing and which are closed when armature 21 is attracted to the magnetic core structure. The output circuit connected to contacts 23 thus is energized upon closing of contacts 23 to provide an indication of the AND function.

The operation of the embodiment of FIG. 1 will be apparent from considering the situation in which only one of coils 18, 19 is energized. Under these conditions, the magnetomotive force generated by the energized coil will produce a flux flow around a closed path including the core leg on which the energized coil is mounted, bridging member 17, the opposite core leg and the portion of base member 11 joining core legs 12 and 13. Under these conditions substantially no flux will flow through the air gap between bridging member 17 and armature 21, since the reluctance of the previously described path is so much less than that through the path including this air gap. With no appreciable flux flow across the air gap, there is insufficient attractive force on armature 21 to overcome biasing spring 22, and armature 21 hence remains in the open position shown in the drawing, with contacts 23 opened. The above described action is independent of the amplitude of the current flow through the energized ones of coils 18 or 19 since an increase in the magnetomotive force of one of the coils alone can increase the flux flow through the low reluctance path described above until the path is magnetically saturated, but it does not produce any substantially flux flow through the air gap between bridging member 17 and armature 21. Thus with only one of coils 18, 19 energized, armature 21 remains in the unattracted position shown, regardless of the degree of energization of that coil. This independence from sensitivity to energizing current magnitude is a distinct advantage in many applications, since it permits variation over a considerable range in input current amplitudes and hence does not require close tolerances.

When both coils 18 and 19 are energized, it will be seen that the M.M.F. of each of these coils produces a flux flow upwardly in its associated leg, with each of these M.M.F.'s opposing in its associated leg any flux flow due to the M.M.F. from the opposite leg. Under these conditions, the flux from the two energized coils flows upwardly in each of the legs 12, 13, through bridging member 17, across the air gap between member 17 and armature 21, through armature 21 to the air gaps between the ends of armature 21 and the pole faces of core member 14 and 15, and then through these core members back through base member 11 to the associated legs. This flux flow through the air gaps will be sufficient to attract armature 21 to the magnetic core structure thus closing contacts 23 and providing the AND output signal. The exact distribution of flux flow through the parallel paths including legs 14 and 15 will depend upon a number of factors, such as the sizes of the respective air gaps and the relative sizes of the M.M.F's of the two energized coils 18, 19 but regardless of substantial variations in the flux flow, armature 21 will be attracted to the core structure to produce the AND output signal. That is, even if the flux flow is not evenly distributed between legs 14, 15 the flux across the air gaps will be sufficient to attract the armature to the core structure.

It will be noted that the apparatus of FIG. 1 requires only coexistence of energization of coils 18 and 19 and does not require coincident energization of these two coils. Thus, there can be a substantial time difference between the energization of one coil and the energization of the other coil, so long as there is coexistence of energization of the two coils for a length of time sufficient to permit a flux buildup to attract armature 21 to the core structure. This characteristic of the apparatus of the present invention is particularly significant in performing AND functions with pulses of short duration, since in the apparatus of the present invention these pulses need not coincide exactly in time to produce an AND output.

FIG. 2 illustrates an alternative embodiment of the invention utilizing a magnetic core structure, having a base member 31 with three legs 32, 33, 34 thereon. Each of these core legs has associated therewith an energizing winding 36, 37, 38, respectively, and each of these windings has associated input terminals 36a, 37a, 38a respectively. As indicated by the arrows the magnetomotive forces of these windings oppose each other in their respective legs. The core structure has associated therewith an armature member 39 which, in the absence of effective magnetomotive forces from the coils 36, 37, 38, is maintained spaced from the core by suitable biasing means such as springs 41. The armature 39 may be provided with suitable means for producing an indication of the position of the armature, such as a pair of contacts 43, which are open when the armature is in the attracted position shown in the drawing and which are closed when the armature is not attracted. An AND output is to be produced by a variety of combinations. Any one coil on any one leg may be energized to latch the armature against the core structure, the flux therefrom circulating through the armature and all three legs and their base member. Then, energization of either one of the other coils will not reduce the force of attraction but will merely change the distribution of the flux in the structure.

However, when all three coils 36, 37 and 38 are energized the M.M.F. from the energization of each of these coils opposes the flow of flux through its associated core leg from the M.M.F.'s of the other two energized coils, with the net result that there is no appreciable flux flow through any part of the magnetic circuit including armature 39. With no appreciable flux flow, there is no appreciable magnetic force attracting armature 39 to the core legs and hence the biasing force of springs 41 withdraws armature 39 from engagement with the ends of the core legs. This change in position of armature 39 closes contacts 43, providing an output signal indicating the simultaneous existence of input pulses at terminals 36a, 37a, 38a. Here again it is not necessary that the input pulses coincide in time at input terminals 36a, 37a, 38a; it is only necessary that they coexist for a length of time sufficient to permit armature 39 to drop out. Thus, considerable tolerance may be allowed in the start and end times of the input pulses, so long as they all have a period of coexistence sufficient to permit movement of armature 39 away from the core structure. The magnitude of the energization of each of the coils may also have broad tolerances and the net effect will still be near cancellation of the flux in the gap.

From the above description, it will be apparent that we have provided electromagnetic apparatus capable of performing logical operations by selective control of windings associated with an electromagnetic core structure. It will be seen from the above discussion that the structure of this invention is capable of providing rapid, reliable AND gate operation in response to the simultaneous existence of two or more input pulses, and that this operation is substantially independent of the electrical magnitude of the input signal within given limits. It will also be appreciated that the apparatus of this invention does not require coincidence of the input pulses, but only requires that there be coexistence among the input pulses which are to operate the device.

While the invention has been particularly shown and described with reference to preferred embodiments thereof, it will be understood by those skilled in the art that various changes in the form and details may be made therein without departing from the spirit and scope of the invention.

What is claimed is:

1. Electromagnetic apparatus for performing logical operations comprising a magnetic core structure including a base member and a plurality of legs, an armature associated with said core, coil means disposed upon each of said legs for producing a magnetomotive force in each of said legs, said magnetomotive forces at all times opposing each other in said legs on which the associated coil is energized, means for selectively energizing said coils, each said coil when energized sending flux through those of said legs whose associated coils are de-energized, said legs and said coils being disposed so that when all of said coils are energized no appreciable flux flows from any one of said legs to any of the other of said legs, said armature having a first position in response to said flux flow through said de-energized legs when at least one but less than all of said coils are energized and having a second position in response to the lack of flux flow from any one of said legs to any of the other of said legs when all of said coils are energized, and means responsive to said armature being in said second position in response to simultaneous energization of all of said coils to provide a measure of said simultaneous energization.

2. Electromagnetic apparatus for performing logical operations comprising a magnetic core structure including a base and a plurality of legs, an armature associated with said core, said legs being disposed between said base member and said armature, coil means disposed upon each of said legs for producing a magnetomotive force in each of said legs, said magnetomotive forces at all times opposing each other in said legs on which the associated coil is energized, means for selectively energizing said coils, each said coil when energized sending flux through those of said legs whose associated coils are de-energized, said legs and said coils being disposed so that when all of said coils are energized no appreciable flux flows from any one of said legs to any of the other of said legs, said armature having a first position in response to said flux flow through said de-energized legs when at least one but less than all of said coils are energized and having a second position in response to the lack of flux flow from any one of said legs to any of the other of said legs when all of said coils are energized, and means responsive to said armature being in said second position in response to simultaneous energization of all of said coils to provide a measure of said simultaneous energization.

3. Electromagnetic apparatus for performing logical operations comprising a magnetic core structure including a base member and a plurality of legs, an armature associated with said core, an air gap between said armature and said core, said legs being disposed between said base member and said air gap, coil means disposed upon each of said legs for producing a magnetomotive force in each of said legs, said magnetomotive force at all times opposing each other in said legs on which the associated coil is energized, means for selectively energizing said coils, each said coil when energized sending flux through those of said legs whose associated coils are de-energized, said legs and said coils being disposed so that when all of said coils are energized no appreciable flux flows from any one of said legs to any of the other of said legs, said armature having a first position in response to said flux flow through said de-energized legs when at least one but less than all of said coils are energized and having a second position in response to the lack of flux flow from any one of said legs to any of the other of said legs when all of said coils are energized, and means responsive to said armature being in said second position in response to simultaneous energization of all of said coils to provide a measure of said simultaneous energization.

4. Electromagnetic apparatus for performing logical operations comprising a magnetic core structure including a base member and a pair of legs, an armature associated with said core, coil means disposed upon each of said legs for producing a magnetomotive force in each of said legs, said magnetomotive forces at all times opposing each other in said legs on which the associated coil is energized, means for selectively energizing said coils, each said coil when energized sending flux through the other of said legs when the coil of said other leg is de-energized, said legs and said coils being disposed so that when both of said coils are energized no appreciable flux flows from either of said legs to the other of said legs, said armature having a first position in response to said flux flow through said de-energized legs when less than both of said coils are energized and having a second position in response to the lack of flux flow from either of said legs to the other of said legs when both of said coils are energized, and means responsive to said armature being in said second position in response to simultaneous energization of both of said coils to provide a measure of said simultaneous energization.

5. Electromagnetic apparatus for performing logical operations comprising a magnetic core structure including a base member and a pair of legs, an armature associated with said core, an air gap between said armature and said core, said legs being disposed between said base member and said air gap, coil means disposed upon each of said legs for producing a magnetomotive force in each of said legs, said magnetomotive forces at all times opposing each other in said legs on which the associated coil is energized, means for selectively energizing said coils, each said coil when energized sending flux through the other of said legs when the coil of said other leg is de-energized, said legs and said coils being disposed so that when both of said coils are energized no appreciable flux flows from either of said legs to the other of said legs, said armature having a first position in response to said flux flow through said de-energized legs when less than both of said coils are energized and having a second position in response to the lack of flux flow from either of said legs to the other of said legs when both of said coils are energized, and means responsive to said armature being in said second position in response to simultaneous energization of both of said coils to provide a measure of said simultaneous energization.

6. Electromaagnetic apparatus for performing logical operations comprising a magnetic core structure including a base member and a pair of legs, an armature associated with said core, an air gap between said armature and said core, said legs being disposed between said base member and said air gap, coil means disposed upon each of said legs for producing a magnetomotive force in each of said legs, said magnetomotive forces at all times opposing each other in said legs on which the associated coil is energized, means for selectively energizing said coils, each said coil when energized sending flux through the other of said legs when the coil of said other leg is de-energized, said legs and said coils being disposed so that when both of said coils are energized no appreciable flux flows from either of said legs to the other of said legs, said armature having an unattracted position in response to said flux flow through said de-energized legs when less than both of said coils are energized and having an attracted position in response to the lack of flux flow from either of said legs to the other of said legs when both of said coils are energized, and means responsive to said armature being in said attracted position in response to simultaneous energization of both of said coils to provide a measure of said simultaneous energization.

7. Electromagnetic apparatus for performing logical operations comprising a magnetic core structure including a base member and three legs, a movable armature associated with said core, coil means disposed upon each of said legs for producing a magnetomotive force in each of said legs, said magnetomotive forces at all times opposing each other in said legs on which the associated coil is energized, means for selectively energizing said coils, each said coil when energized sending flux through those of said legs whose associated coils are de-energized, said legs and said coils being disposed so that when all of said coils are energized no appreciable flux flows from any one of said legs to any of the other of said legs, said armature having a first position in response to said flux flow through said de-energized legs when at least one but less than all of said coils are de-energized and having a second position in response to the lack of flux flow from any one of said legs to any of the other of said legs when all of said coils are energized, and means responsive to said armature being in said second position in response to simultaneous energization of all of said coils to provide an indication of said simultaneous energization.

8. Electromagnetic apparatus for performing logical operations comprising a magnetic core structure including a base member and three legs, a movable armature associated with said core, coil means disposed upon each of said legs for producing a magnetomotive force in each of said legs, said magnetomotive forces at all times opposing each other in said legs on which the associated coil is energized, means for selectively energizing said coils, each said coil when energized sending flux through those of said legs whose associated coils are de-energized, said legs and said coils being disposed so that when all of said coils are energized no appreciable flux flows from any one of said legs to any of the other of said legs, said armature having an attracted position in response to said flux flow through said de-energized legs when at least one but less than all of said coils are de-energized and having an unattracted position in response to the lack of flux flow from any one of said legs to any of the other of said legs when all of said coils are energized, and means responsive to said armature being in said unattracted position in response to simultaneous energization of all of said coils to provide an indication of said simultaneous energization.

9. Electromagnetic apparatus for performing logical operations comprising a magnetic core structure including a base member and three legs, a movable armature associated with said core, means biasing said armature away from said core, coil means disposed upon each of said legs for producing a magnetomotive force in each of said legs, said magnetomotive forces at all times opposing each other in said legs on which the associated coil is energized, means for selectively energizing said coils, each said coil when energized sending flux through those of said legs whose associated coils are de-energized, said legs and said coils being disposed so that when all of said coils are energized no appreciable flux flows from any one of said legs to any of the other of said legs, said armature having an attracted position in response to said flux flow through said de-energized legs when at least one but less than all of said coils are de-energized and having an unattracted position in response to the lack of flux flow from any one of said legs to any of the other of said legs when all of said coils are energized, and means responsive to said armature being in said unattracted position in response to simultaneous energization of all of said coils to provide an indication of said simultaneous energization.

References Cited in the file of this patent

UNITED STATES PATENTS

| | | |
|---|---|---|
| 2,436,224 | Ogle | Feb. 17, 1948 |
| 2,458,954 | Marquez | Jan. 11, 1949 |
| 2,638,035 | Macgeorge et al. | May 12, 1953 |
| 2,959,219 | Hajny | Nov. 8, 1960 |